US008213440B2

(12) United States Patent
Bantukul et al.

(10) Patent No.: US 8,213,440 B2
(45) Date of Patent: *Jul. 3, 2012

(54) METHODS, SYSTEMS, AND COMPUTER PROGRAM PRODUCTS FOR USING A LOCATION ROUTING NUMBER BASED QUERY AND RESPONSE MECHANISM TO ROUTE CALLS TO IP MULTIMEDIA SUBSYSTEM (IMS) SUBSCRIBERS

(75) Inventors: Apirux Bantukul, Cary, NC (US); Venkataramaiah Ravishankar, Cary, NC (US); Peter J. Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/731,772

(22) Filed: Mar. 30, 2007

(65) Prior Publication Data

US 2008/0198862 A1 Aug. 21, 2008

Related U.S. Application Data

(60) Provisional application No. 60/902,543, filed on Feb. 21, 2007.

(51) Int. Cl.
*H04L 12/28* (2006.01)
*H04L 12/56* (2006.01)
(52) U.S. Cl. ............... 370/401; 370/352; 379/221.13
(58) Field of Classification Search .................. None
See application file for complete search history.

(56) References Cited

U.S. PATENT DOCUMENTS

| | | | |
|---|---|---|---|
| 3,917,915 A | 11/1975 | Karras |
| 4,162,377 A | 7/1979 | Mearns |
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |

(Continued)

FOREIGN PATENT DOCUMENTS

EP 0 088 639 9/1983

(Continued)

OTHER PUBLICATIONS

Notification of Transmittal of the International Search Report and the Written Opinion of the International Searching Authority, or the Declaration for the International Application No. PCT/US08/02154 (May 20, 2008).

(Continued)

*Primary Examiner* — Jay Y Lee
(74) *Attorney, Agent, or Firm* — Jenkins, Wilson, Taylor & Hunt, P.A.

(57) ABSTRACT

Methods, systems, and computer program products for using an LRN based query and response mechanism (e.g., a switching office number portability processing system) to route calls to IP multimedia subsystem (IMS) subscribers are disclosed. According to one method, an LRN based response message including a communications service subscriber identifier is received. An IMS gateway LRN associated with the communications service subscriber identifier may be determined. The IMS gateway LRN associated with the communications service subscriber identifier may be inserted into the LRN based response message and routing the message.

26 Claims, 6 Drawing Sheets

U.S. PATENT DOCUMENTS

| | | | |
|---|---|---|---|
| 4,769,834 A | 9/1988 | Billinger et al. | |
| 4,788,718 A | 11/1988 | McNabb et al. | |
| 4,897,835 A | 1/1990 | Gaskill et al. | |
| 4,897,870 A | 1/1990 | Golden | |
| 4,959,849 A | 9/1990 | Bhusri | |
| 4,972,461 A | 11/1990 | Brown et al. | |
| 5,008,929 A | 4/1991 | Olsen et al. | |
| 5,150,357 A | 9/1992 | Hopner et al. | |
| 5,291,481 A | 3/1994 | Doshi et al. | |
| 5,315,580 A | 5/1994 | Phaal | |
| 5,341,608 A | 8/1994 | Mains, Jr. | |
| 5,402,474 A | 3/1995 | Miller et al. | |
| 5,426,688 A | 6/1995 | Anand | |
| 5,430,709 A | 7/1995 | Galloway | |
| 5,438,570 A | 8/1995 | Karras et al. | |
| 5,457,692 A | 10/1995 | Ishinabe et al. | |
| 5,457,729 A | 10/1995 | Hamann et al. | |
| 5,473,596 A | 12/1995 | Garafola et al. | |
| 5,475,732 A | 12/1995 | Pester, III | |
| 5,506,893 A | 4/1996 | Buscher et al. | |
| 5,521,902 A | 5/1996 | Ferguson | |
| 5,539,804 A | 7/1996 | Hong et al. | |
| 5,546,398 A | 8/1996 | Tucker et al. | |
| 5,550,914 A | 8/1996 | Clarke et al. | |
| 5,572,579 A | 11/1996 | Orriss et al. | |
| 5,579,371 A | 11/1996 | Aridas et al. | |
| 5,583,926 A | 12/1996 | Venier et al. | |
| 5,586,177 A | 12/1996 | Farriss et al. | |
| 5,592,530 A | 1/1997 | Brockman et al. | |
| 5,598,464 A | 1/1997 | Hess et al. | |
| 5,602,909 A | 2/1997 | Carkner et al. | |
| 5,606,600 A | 2/1997 | Elliott | |
| 5,610,969 A | 3/1997 | McHenry et al. | |
| 5,610,977 A | 3/1997 | Williams et al. | |
| 5,625,681 A | 4/1997 | Butler, II | |
| 5,671,225 A | 9/1997 | Hooper et al. | |
| 5,689,555 A | 11/1997 | Sonnenberg | |
| 5,696,816 A | 12/1997 | Sonnenberg | |
| 5,712,908 A | 1/1998 | Brinkman et al. | |
| 5,740,239 A | 4/1998 | Bhagat et al. | |
| 5,757,895 A | 5/1998 | Aridas et al. | |
| 5,764,745 A | 6/1998 | Chan et al. | |
| 5,768,352 A | 6/1998 | Elliott et al. | |
| 5,768,358 A | 6/1998 | Venier et al. | |
| 5,771,284 A | 6/1998 | Sonnenberg | |
| 5,774,532 A | 6/1998 | Gottlieb et al. | |
| 5,784,443 A | 7/1998 | Chapman et al. | |
| 5,796,813 A | 8/1998 | Sonnenberg | |
| 5,812,639 A | 9/1998 | Bartholomew et al. | |
| 5,838,683 A | 11/1998 | Corley et al. | |
| 5,867,558 A | 2/1999 | Swanson | |
| 5,999,525 A | 12/1999 | Krishnaswamy et al. | |
| 6,009,160 A | 12/1999 | Sonnenberg | |
| 6,021,126 A | 2/2000 | White et al. | |
| 6,028,914 A | 2/2000 | Lin et al. | |
| 6,091,957 A | 7/2000 | Larkins et al. | |
| 6,091,959 A | 7/2000 | Souissi et al. | |
| 6,094,573 A | 7/2000 | Heinonen et al. | |
| 6,097,719 A | 8/2000 | Benash et al. | |
| 6,108,332 A | 8/2000 | Kasiviswanathan | |
| 6,108,782 A | 8/2000 | Fletcher et al. | |
| 6,111,946 A | 8/2000 | O'Brien | |
| 6,115,754 A | 9/2000 | Landgren | |
| 6,119,014 A | 9/2000 | Alperovich et al. | |
| 6,122,510 A | 9/2000 | Granberg | |
| 6,128,304 A | 10/2000 | Gardell et al. | |
| 6,128,377 A | 10/2000 | Sonnenberg | |
| 6,134,307 A | 10/2000 | Brouckman et al. | |
| 6,134,314 A | 10/2000 | Dougherty et al. | |
| 6,134,316 A | 10/2000 | Kallioniemi et al. | |
| 6,134,432 A | 10/2000 | Holmes et al. | |
| 6,134,618 A | 10/2000 | Hebert | |
| 6,137,869 A | 10/2000 | Voit et al. | |
| 6,138,023 A | 10/2000 | Agarwal et al. | |
| 6,181,937 B1 | 1/2001 | Joensuu | |
| 6,182,086 B1 | 1/2001 | Lomet et al. | |
| 6,215,790 B1 | 4/2001 | Voit et al. | |
| 6,219,551 B1 | 4/2001 | Hentilä et al. | |
| 6,249,572 B1 | 6/2001 | Brockman et al. | |
| 6,252,952 B1 | 6/2001 | Kung et al. | |
| 6,272,136 B1 | 8/2001 | Lin et al. | |
| 6,301,609 B1 | 10/2001 | Aravamudan et al. | |
| 6,304,565 B1 | 10/2001 | Ramamurthy | |
| 6,321,268 B1 | 11/2001 | Dillon et al. | |
| 6,324,183 B1 | 11/2001 | Miller et al. | |
| 6,333,931 B1 | 12/2001 | LaPier et al. | |
| 6,359,979 B1 | 3/2002 | Wang et al. | |
| 6,363,411 B1 | 3/2002 | Dugan et al. | |
| 6,373,930 B1 | 4/2002 | McConnell et al. | |
| 6,424,621 B1 | 7/2002 | Ramaswamy et al. | |
| 6,430,176 B1 | 8/2002 | Christie, IV | |
| 6,434,155 B1 | 8/2002 | Jones et al. | |
| 6,438,223 B1 | 8/2002 | Eskafi et al. | |
| 6,446,127 B1 | 9/2002 | Schuster et al. | |
| 6,453,034 B1 | 9/2002 | Donovan et al. | |
| 6,456,708 B1 | 9/2002 | Copley et al. | |
| 6,466,796 B1 | 10/2002 | Jacobson et al. | |
| 6,470,179 B1 | 10/2002 | Chow et al. | |
| 6,510,164 B1 | 1/2003 | Ramaswamy et al. | |
| 6,515,997 B1 | 2/2003 | Feltner et al. | |
| 6,564,261 B1 | 5/2003 | Gudjonsson et al. | |
| 6,571,094 B1 | 5/2003 | Begeja et al. | |
| 6,606,668 B1 | 8/2003 | MeLampy et al. | |
| 6,611,516 B1 | 8/2003 | Pirkola et al. | |
| 6,639,981 B1 | 10/2003 | Dunn, Jr. et al. | |
| 6,711,251 B1 | 3/2004 | Kieren | |
| 6,718,178 B1 | 4/2004 | Sladek et al. | |
| 6,731,741 B1 | 5/2004 | Fourcand et al. | |
| 6,735,621 B1 | 5/2004 | Yoakum et al. | |
| 6,747,970 B1 | 6/2004 | Lamb et al. | |
| 6,760,343 B1 | 7/2004 | Krishnamurthy et al. | |
| 6,836,477 B1 | 12/2004 | West, Jr. et al. | |
| 6,865,266 B1* | 3/2005 | Pershan | 379/221.13 |
| 6,944,666 B2 | 9/2005 | Belkin | |
| 6,963,583 B1 | 11/2005 | Foti | |
| 6,968,052 B2 | 11/2005 | Wullert, II | |
| 6,975,855 B1 | 12/2005 | Wallenius | |
| 7,027,433 B2 | 4/2006 | Tuohino et al. | |
| 7,031,747 B2 | 4/2006 | Cyr et al. | |
| 7,058,036 B1 | 6/2006 | Yu et al. | |
| 7,085,260 B2 | 8/2006 | Karaul et al. | |
| 7,136,651 B2 | 11/2006 | Kalavade | |
| 7,194,082 B2 | 3/2007 | Kieren | |
| 7,260,207 B2 | 8/2007 | Marsico | |
| 7,286,545 B1 | 10/2007 | Tester et al. | |
| 7,372,826 B2 | 5/2008 | Dahod et al. | |
| 7,403,517 B2 | 7/2008 | Westman | |
| 7,606,202 B2 | 10/2009 | Marathe et al. | |
| 7,664,495 B1 | 2/2010 | Bonner et al. | |
| 7,864,752 B1 | 1/2011 | Bennett et al. | |
| 8,073,127 B2 | 12/2011 | Bantukul et al. | |
| 2001/0031641 A1 | 10/2001 | Ung et al. | |
| 2001/0034224 A1 | 10/2001 | McDowell et al. | |
| 2001/0040957 A1 | 11/2001 | McCann et al. | |
| 2002/0048360 A1 | 4/2002 | Zambre et al. | |
| 2002/0058507 A1 | 5/2002 | Valentine et al. | |
| 2002/0111153 A1 | 8/2002 | Hartmaier et al. | |
| 2003/0026289 A1 | 2/2003 | Mukherjee et al. | |
| 2003/0031160 A1 | 2/2003 | Gibson Ang et al. | |
| 2003/0037108 A1 | 2/2003 | Peiffer et al. | |
| 2003/0050969 A1 | 3/2003 | Sant et al. | |
| 2003/0081754 A1* | 5/2003 | Esparza et al. | 379/221.01 |
| 2003/0095541 A1 | 5/2003 | Chang et al. | |
| 2003/0177281 A1 | 9/2003 | McQuillan et al. | |
| 2003/0203740 A1 | 10/2003 | Bahl et al. | |
| 2003/0231623 A1 | 12/2003 | Ryu et al. | |
| 2004/0003037 A1 | 1/2004 | Fukimoto et al. | |
| 2004/0024894 A1 | 2/2004 | Osman et al. | |
| 2004/0082332 A1 | 4/2004 | McCann et al. | |
| 2004/0153506 A1 | 8/2004 | Ito et al. | |
| 2004/0184435 A1 | 9/2004 | Westman | |
| 2004/0223604 A1 | 11/2004 | Kieren | |
| 2004/0264671 A1 | 12/2004 | Lamberton et al. | |
| 2005/0027867 A1 | 2/2005 | Mueller et al. | |
| 2005/0070310 A1 | 3/2005 | Caspi et al. | |
| 2005/0111632 A1 | 5/2005 | Caputo et al. | |
| 2005/0111641 A1 | 5/2005 | Koskinen et al. | |

| | | | |
|---|---|---|---|
| 2005/0202836 | A1 | 9/2005 | Schaedler et al. |
| 2005/0281399 | A1 | 12/2005 | Moisey et al. |
| 2005/0286531 | A1* | 12/2005 | Tuohino et al. ............ 370/395.2 |
| 2006/0034270 | A1 | 2/2006 | Haase et al. |
| 2006/0079236 | A1 | 4/2006 | Del Pino et al. |
| 2006/0104431 | A1 | 5/2006 | Emery et al. |
| 2006/0105766 | A1 | 5/2006 | Azada et al. |
| 2006/0136557 | A1* | 6/2006 | Schaedler et al. ............ 709/203 |
| 2006/0143517 | A1 | 6/2006 | Douceur et al. |
| 2006/0291488 | A1 | 12/2006 | Naqvi et al. |
| 2007/0086582 | A1 | 4/2007 | Tai et al. |
| 2007/0100981 | A1 | 5/2007 | Adamczyk et al. |
| 2007/0121908 | A1 | 5/2007 | Benedyk et al. |
| 2007/0127436 | A1 | 6/2007 | Karimi-Cherkandi et al. |
| 2007/0258575 | A1* | 11/2007 | Douglas et al. .......... 379/221.13 |
| 2008/0031196 | A1 | 2/2008 | Marathe et al. |
| 2008/0112393 | A1 | 5/2008 | Ho et al. |
| 2008/0160995 | A1 | 7/2008 | Thiebaut et al. |
| 2008/0198996 | A1 | 8/2008 | Bantukul et al. |
| 2008/0198999 | A1 | 8/2008 | Bantukul et al. |
| 2008/0209564 | A1 | 8/2008 | Gayde et al. |
| 2008/0254833 | A1 | 10/2008 | Keevill et al. |
| 2009/0047932 | A1 | 2/2009 | McNamara et al. |
| 2009/0052415 | A1 | 2/2009 | Ishii et al. |
| 2009/0074174 | A1 | 3/2009 | Allen et al. |
| 2009/0109903 | A1 | 4/2009 | Vikberg et al. |
| 2009/0296694 | A1 | 12/2009 | Kalyanpur et al. |
| 2010/0202446 | A1 | 8/2010 | McCann et al. |
| 2011/0098049 | A1 | 4/2011 | Gosnell et al. |

FOREIGN PATENT DOCUMENTS

| | | |
|---|---|---|
| EP | 0 212 654 | 5/1987 |
| EP | 0 258 654 | 3/1988 |
| EP | 0 264 023 | 4/1988 |
| EP | 0 669 771 A1 | 8/1995 |
| EP | 0 865 218 A2 | 9/1998 |
| EP | 1 100 279 A2 | 5/2001 |
| GB | 2 382 267 | 5/2003 |
| JP | 58-215164 | 12/1983 |
| JP | 62-200859 | 9/1987 |
| KR | 1020030025024 A | 3/2003 |
| KR | 10-2003-0066043 | 8/2003 |
| KR | 10-2006-0090378 | 8/2006 |
| KR | 10-2007-0061774 | 6/2007 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 98/25392 A2 | 6/1998 |
| WO | WO 99/14910 | 3/1999 |
| WO | WO 00/16583 | 3/2000 |
| WO | WO 00/35155 A1 | 6/2000 |
| WO | WO 01/20920 | 3/2001 |
| WO | WO 01/56308 A2 | 8/2001 |
| WO | WO 2006/031678 A2 | 3/2006 |
| WO | WO 2008/013977 A2 | 1/2008 |
| WO | WO 2008/103333 A1 | 8/2008 |
| WO | WO 2008/103337 A1 | 8/2008 |
| WO | WO 2008/130709 A2 | 10/2008 |
| WO | WO 2010/083509 A2 | 7/2010 |

OTHER PUBLICATIONS

Notification of Transmittal of the International Search Report and the Written Opinion of the International Searching Authority, or the Declaration for International Application No. PCT/US08/02147 (May 20, 2008).

Notification of Transmittal of the International Search Report and the Written Opinion of the International Searching Authority, or the Declaration for International Application No. PCT/US08/02150 (May 20, 2008).

"Mobile Wireless Overview," Cisco IOS Mobile Wireless Configuration Guide, pp. MWC-1-MWC-8 (Publication Date Unknown).

Official Action for U.S. Appl. No. 12/016,807 (Aug. 5, 2010).

Notification of Transmittal of the International Search Report and the Written Opinion of the International Searching Authority, or the Declaration for International Application No. PCT/US2008/005176 (May 25, 2010).

Restriction and/or Election Requirement for U.S. Appl. No. 12/106,807 (Apr. 28, 2010).

Notification of Transmittal of the International Search Report and the Written Opinion of the International Searching Authority, or the Declaration of Interntional Application No. PCT/US2009/046038 (Jan. 21, 2010).

Commonly-assigned, co-pending U.S. Appl. No. 12/689,702 for "Methods, Systems, and Computer Readable Media for Centralized Routing and Call Instance Code Management for Bearer Independent Call Control (BICC) Signaling Messages," (Unpublished, filed Jan. 19, 2010).

"BICC Architecture and BICC Protocol Details," Tekelec, p. 28-41 (2008).

"BICC Signaling Router (BSR) Reference Architecture (WP005274)," Tekelec, p. 2-91 (2008).

"GPRS Tunneling Protocol (GTP)," Trillium, Continuous Computing, pp. 1-3 (Copyright 2007).

"Telecommunications and Internet Converged Services and Protocols for Advanced Networking (TISPAN); Interworking Between Session Initiation Protocol (SIP) and Bearer Independent Call Control (BICC) Protocol or ISDN User Part (ISUP)," ETSI EN 383 001 V1.1.1 (Jun. 2006).

"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).

"Gateway Control Protocol: Version 3," Series H: Audiovisual and Multimedia Systems; Infrastructure of Audiovisual Services—Communication Procedures, ITU-T H.248.1 (Sep. 2005).

"Interworking Between Session Initiation Protocol (SIP) and Bearer Independent Call Control Protocol or ISDN User Part," ITU-T Q.1912.5, p. 1-101 (Mar. 2004).

"Services and Protocols for Advanced Networks (SPAN); Bearer Independent Call Control (BICC) Capability Set 2 (CS2); Protocol Specification," ETSI EN 302 213 V1.1.2 (Jan. 2004).

"INAP Feature Module," Cisco MGC Software Release 9.5(2), pp. 1-16 (Dec. 3, 2003).

"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).

Camarillo et al., "Mapping of Integrated Services Digital Network (ISDN) User Part (ISUP) Overlap Signalling to the Session Initiation Protocol (SIP)," Network Working Group, RFC 3578 (Aug. 2003).

"Series Q: Switching and Signalling; Broadband ISDN—Signalling ATM Adaptation Layer (SAAL); Signalling Transport converter on SCTP," ITU-T Q.2150.3 (Dec. 2002).

"Bearer Independent Call Bearer Control Protocol," ITU-T Q.1950, p. 1-96 (Dec. 2002).

Camarillo et al., "Integrated Services Digital Network (ISDN) User Part (ISUP) to Session Initiation Protocol (SIP) Mapping," Network Working Group, RFC 3398 (Dec. 2002).

Vemuri et al., "Session Initiation Protocol for Telephones (SIP-T): Context and Architectures," Network Working Group, RFC 3372 (Sep. 2002).

Chang, "BICC Extension of SIP in Inter-Network Configuration," Internet Engineering Task Force, draft-chang-sipping-bicc-network-00.txt, pp. 1-17 (Mar. 2002).

Multiservice Switching Forum, "Implementation Agreement for BICC," MSF-IA-BICC.001-FINAL (Feb. 2002).

Marshall et al., "SIP Extensions for Supporting Distributed Call State," SIP Working Group, Internet Draft, pp. 1-12 (Aug. 2001).

"Searies Q: Switching and Signalling; Specification of Signalling Related to Bearer Independent Call Control (BICC); Bearer Independent Call Control Protocol (Capability Set 2): Basic Call Procedures," ITU-T Q1902.4 (Jul. 2001).

"Bearer Independent Call Control Protocol (Capability Set 2) and Signalling System No. 7 ISDN User Part: Formats and Codes," ITU-T Q.1902.3, p. 1-141 (Jul. 2001).

"Bearer Independent Call Control Protocol (Capability Set 2) and Signaling System No. 7 ISDN user part: General Functions of Messages and Parameters," ITU-T Q.1902.2 (Jul. 2001).

"Bearer Independent Call Control Protocol (Capability Set 2): Functional Description," ITU-T Q.1902.1, p. 1-23 (Jul. 2001).

"Series Q: Switching and Signalling, Specification of Signalling Related to Bearer Independent Call Control (BICC); BICC Bearer Control Tunnelling Protocol," ITU-T Q.1990 (Jul. 2001).

"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).

"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q1912.1 (Jul. 2001).

"Series Q: Switching and Signalling; Interworking Between Selected Signalling Systems (PSTN Access, DSS1, C5, R1, R2, TUP) and the Bearer Independent Call Control Protocol," ITU-T Q1912.2 (Jul. 2001).

"Signalling Transport Converter on MTP3 and MTP3b," ITU-T Q.2150.1 (May 2001).

"Generic Signalling Transport Service," ITU-T Q.2150.0 (May 2001).

"ITU-Q1970: Draft New ITU-T Recommendation Q.1970 BICC IP Bearer Control Protocol," Network Dictionary (2001).

"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).

"Bearer Independent Call Control Protocol," ITU-T Q.1901 (Jun. 2000).

"Interface Recommendation for Intelligent Network Capability Set 3: SCF-SSF Interface," ITU-T, Q.1238.2, pp. 7-9, 73-76, and 85-10 (Jun. 2000).

Sugano et al., "Presence Information Data Format for IMPP," Internet draft, draft-ietf-impp-pidf-01.text, Network Working Group, p. 1-17, (Mar. 10, 2000).

"Signalling System No. 7—ISDN User Part Enhancements for the Support of Number Portability," ITU-T Q.769.1 (Dec. 1999).

"Signalling System No. 7—ISDN User Part Formats and Codes," ITU-T Q.763 (Dec. 1999).

"Signalling System No. 7—ISDN User Part General Functions of Messages and Signals," ITU-T Q.762 (Dec. 1999).

"Signalling System No. 7—ISDN User Part Functional Description," ITU-T Q.761 (Dec. 1999).

"Series Q: Switching and Signalling; Specifications of Signalling System No. 7—ISDN Supplementary Services; ISDN User Part Supplementary Services," ITU-T Q.730 (Dec. 1999).

Liao et al., "SS7-TCAP/IP Interworking," Internet Engineering Task Force, pp. 1-14 (Mar. 1999).

De Ment, "The Evolution of Signaling," NMS Communications, p. 1-28 (Publication Date Unknown).

Final Official Action for U.S. Appl. No. 12/106,807 (Feb. 15, 2011).

Official Action for U.S. Appl. No. 11/731,800 (Jan. 18, 2011).

Official Action for U.S. Appl. No. 11/731,768 (Nov. 26, 2010).

Notification of Transmittal of the International Search Report and the Written Opinion of the International Searching Authority, or the Declaration for International Application No. PCT/US2009/046038 (Jan. 21, 2010).

"Digital Cellular Telecommunications System (Phase 2+); Universal Mobile Telecommunications System (UMTS); Network Architecture," 3GPP TSs 23.002 version 7.1.0 Release 7, ETSI TS 123 002 (Mar. 2006).

ETSI Guide, "Corporate Telecommunication Networks (CN); User Identification in a SIP/QSIG Environment," ETSI EG 202 303 V1.1.1, pp. 1-25 (Apr. 2004).

Notice of Allowance and Fee(s) Due for U.S. Appl. No. 11/881,726 (Jun. 11, 2009).

Notification of Transmittal of the International Search Report and the Written Opinion of the International Searching Authority, or the Declaration for International Application No. PCT/US07/16974 (Sep. 11, 2008).

Commonly assigned, co-pending U.S. Patent Application, "Methods, Systems, and Computer Readable Media for Providing Next Generation Network (NGN)-Based End User Services to Legacy Subscribers in a Communications Network," filed Jun. 2, 2009.

Extended European Search Report for European Application No. 08725747.3 (Dec. 23, 2011).

Official Action for U.S. Appl. No. 12/883,886 (Sep. 30, 2011).

Notice of Abandonment for U.S. Appl. No. 11/731,800 (Aug. 3, 2011).

Non-Final Official Action for U.S. Appl. No. 12/689,702 (Feb. 2, 2012).

Notice of Abandonment for U.S. Appl. No. 12/106,807 (Sep. 1, 2011).

Notice of Allowance and Fee(s) Due for U.S. Appl. No. 11/731,768 (Aug. 1, 2011).

Notification of Transmittal of the International Search Report and the Written Opinion of the International Searching Authority, or the Declaration for International Application No. PCT/US2010/049157 (Jun. 3, 2011).

Notice of Allowance and Fee(s) Due for U.S. Appl. No. 11/731,768 (Apr. 22, 2011).

Supplementary European Search Report for European Patent No. 2 119 212 (Dec. 6, 2010).

Notification of Transmittal of the International Search Report and the Written Opinion of the International Searching Authority, or the Declaration for International Application No. PCT/US2010/021374 (Aug. 19, 2010).

"Operator Guidebook to IMS and New Generation Networks and Services," www.morianagroup.com, Second Edition (Feb. 2006). (Part 1 of 4, pp. 1-Cap 11).

"Operator Guidebook to IMS and New Generation Networks and Services," www.morianagroup.com, Second Edition (Feb. 2006). (Part 2 of 4, pp. Cap 12-Highdeal 26).

"Operator Guidebook to IMS and New Generation Networks and Services," www.morianagroup.com, Second Edition (Feb. 2006). (Part 3 of 4, pp. Highdeal 27-Nokia 13).

"Operator Guidebook to IMS and New Generation Networks and Services," www.morianagroup.com, Second Edition (Feb. 2006). (Part 4 of 4, pp. Nokia 14-Tekviz 15).

"Operator Guidebook to IMS and New Generation Networks and Services," www.morianagroup.com, First Edition (Aug. 2005). (Part 1 of 8, pp. 1-116).

"Operator Guidebook to IMS and New Generation Networks and Services," www.morianagroup.com, First Edition (Aug. 2005). (Part 2 of 8, pp. 117-232).

"Operator Guidebook to IMS and New Generation Networks and Services," www.morianagroup.com, First Edition (Aug. 2005). (Part 3 of 8, pp. 233-348).

"Operator Guidebook to IMS and New Generation Networks and Services," www.morianagroup.com, First Edition (Aug. 2005). (Part 4 of 8, pp. 349-464).

"Operator Guidebook to IMS and New Generation Networks and Services," www.morianagroup.com, First Edition (Aug. 2005). (Part 5 of 8, pp. 465-580).

"Operator Guidebook to IMS and New Generation Networks and Services," www.morianagroup.com, First Edition (Aug. 2005). (Part 6 of 8, pp. 581-696).

"Operator Guidebook to IMS and New Generation Networks and Services," www.morianagroup.com, First Edition (Aug. 2005). (Part 7 of 8, pp. 697-812).

"Operator Guidebook to IMS and New Generation Networks and Services," www.morianagroup.com, First Edition (Aug. 2005). (Part 8 of 8, pp. 813-931).

* cited by examiner

METHODS, SYSTEMS, AND COMPUTER PROGRAM PRODUCTS FOR USING A LOCATION ROUTING NUMBER BASED QUERY AND RESPONSE MECHANISM TO ROUTE CALLS TO IP MULTIMEDIA SUBSYSTEM (IMS) SUBSCRIBERS

RELATED APPLICATIONS

This application claims the benefit of U.S. Provisional Patent Application Ser. No. 60/902,543, filed Feb. 21, 2007; the disclosure of which is incorporated herein by reference in its entirety.

TECHNICAL FIELD

The subject matter described herein relates to modifying location routing number response messages (such as number portability response messages) and network node offloading. More particularly, the subject matter described herein relates to using a location routing number based query and response mechanism to route calls to IP multimedia subsystem (IMS) subscribers.

BACKGROUND

Local Number Portability (LNP) allows telephone service subscribers to retain their same directory numbers when they change service locations and/or service providers. Telephone number portability was mandated by the Telecommunications Act of 1996.

Local number portability is made possible by a location routing number (LRN). When a subscriber's local service is moved to another service provider, such as at another switching office, the ported directory number of the subscriber is associated with the LRN of the ported-to switching office in a number portability database, which in the United States is administered by the Number Portability Administration Center (NPAC). The NPAC distributes number portability data to service provider via local service management systems (LSMSs). The LSMS of each service provider is used to provision the service provider's number portability database. When a call is made to a ported subscriber, the originating switching office has a software-implemented mechanism, referred to as a trigger, which detects that the called party directory number is ported and queries a number portability database. The number portability database returns the LRN of the recipient or ported-to switching office and the originating switching office routes the call to the ported-to switching office.

Because LNP is becoming more common, LNP trigger functionality, or, more generally, LRN based query and response functionality, is becoming a standard feature of switching office equipment. Because LNP trigger functionality is available in most switching office equipment, it may be desirable to use LNP triggers to route calls for reasons other than LNP. However, LNP triggers are typically used for LNP.

One situation for which it may be desirable to use LRN based originating switching office query and response functionality to route a call is when the called subscriber is an IP multimedia subsystem (IMS) subscriber. One possible mechanism for an originating switching office to recognize a call to an IMS subscriber is to provision the switching office with an IMS trigger so that the switching office would query an IMS database to obtain LRN routing information for the IMS subscriber. However, provisioning new switching office triggers can be costly, especially as the number of IMS subscribers increases.

Accordingly, there exists a need for using an LRN based query and response mechanism to route calls to IP multimedia subsystem (IMS) subscriber.

SUMMARY

According to one aspect, the subject matter described herein comprises methods, systems, and computer program products for using an LRN based query and response mechanism (e.g., a switching office number portability processing mechanism) to route calls to IP multimedia subsystem (IMS) subscribers. One method includes receiving a LRN based response message that includes a communications service subscriber identifier. An IMS gateway LRN associated with the communications service subscriber identifier may be determined. The IMS gateway LRN may then be inserted into the LRN based response message, after which the message is transmitted.

In one implementation, receiving an LRN based response message may include intercepting a number portability response message at a routing node located between a switching office and a number portability database where the response is intended for the switching office. The response is modified by the routing node to include the LRN of the IMS gateway and forwarded to the switching office. The switching office uses its number portability processing functionality to extract the LRN from the response and routes the call to the IMS gateway. Thus, a switching offices number portability processing functionality can be used to route calls to IMS subscribers, reducing the need for specialized IMS-related triggers to effect such routing.

According to another aspect, an LRN based query message that includes a communications service subscriber identifier may be received. Further, an IMS gateway LRN associated with the communications service subscriber identifier may be determined. In response to determining the IMS gateway LRN, an LRN based response message associated with the LRN based query message and including the IMS gateway LRN may be generated. The response message is subsequently transmitted.

The subject matter described herein for performing an IMS offload function may be implemented in hardware, firmware, a combination of hardware and software, a combination of hardware and firmware, or a combination of hardware, software, and firmware. As such, the terms "function" or "module" as used herein refer to hardware, firmware, a combination of hardware and software, a combination of hardware and firmware, or a combination of hardware, software, and firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
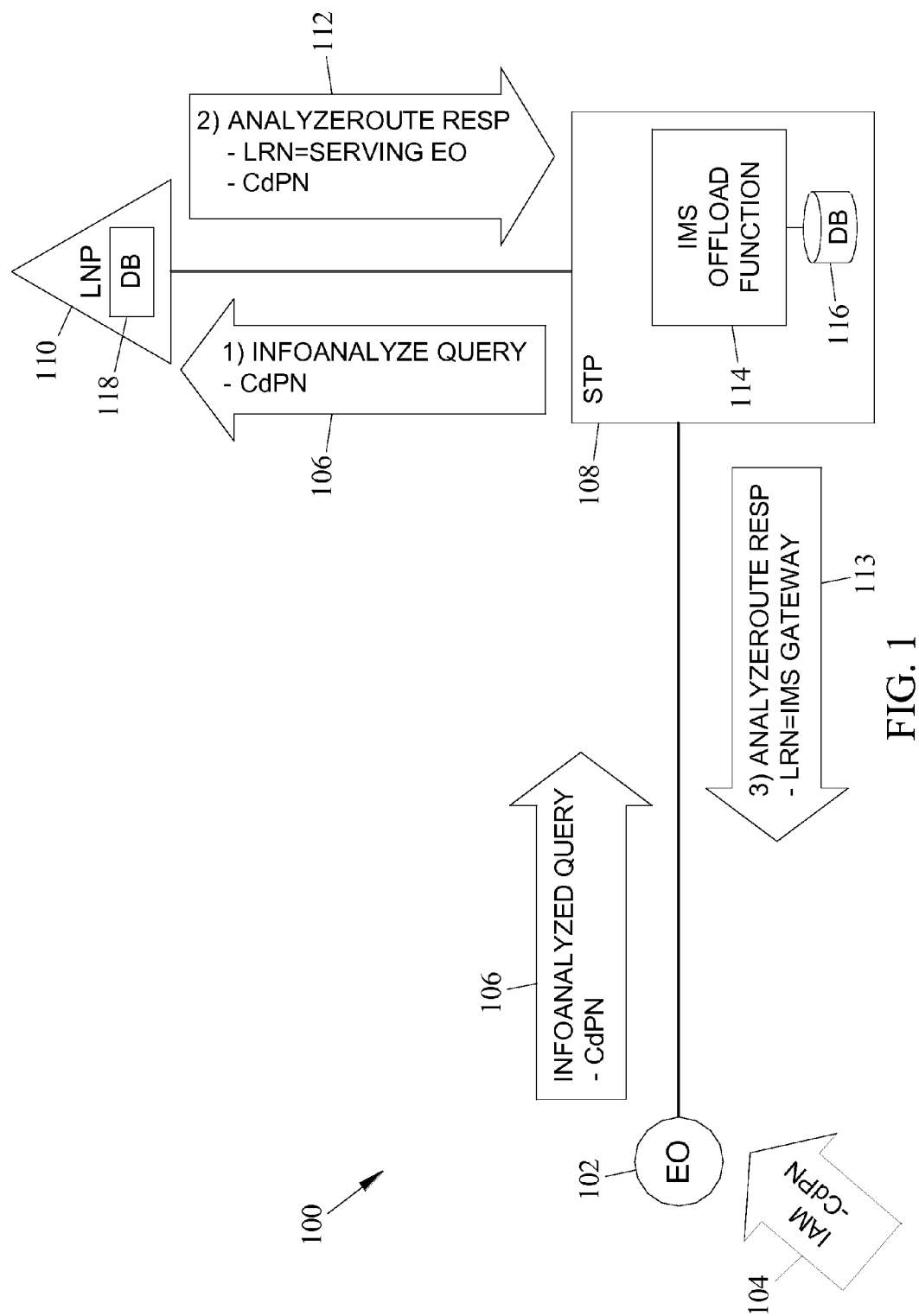
FIG. 1 is a network diagram illustrating an exemplary system for using switching office LRN based query and response capabilities to route a call to an IMS subscriber according to an embodiment of the subject matter described herein.

Methods, systems, and computer program products for using an LRN based query and response mechanism (e.g., a switching office number portability processing mechanism) to route a call to an IMS subscriber according to embodiments of the subject matter described herein may be implemented in any suitable network device or devices. For example, the methods, systems, and computer program products may be implemented in a routing node, a signal transfer point (STP), a router, a switch, a gateway, a media gateway controller, a softswitch or other suitable network routing element. FIG. 1 illustrates an exemplary system for using switching office LRN based query and response capabilities to route a call to an IMS subscriber in a communications network, generally designated 100, according to an embodiment of the subject matter described herein. Although FIG. 1 illustrates a switching office number portability processing system, those skilled in the art realize that the present subject matter is not limited to such and may be applied to any LRN based query and response mechanism for routing calls to an IMS subscriber. Referring to FIG. 1, in response to a call attempt by a communications service subscriber, an end office 102 may send a local number portability (LNP) InfoAnalyzed query 106 to a network routing element 108, which accesses an LNP system 110 including an LNP database 118 in order to retrieve routing information for a ported subscriber (e.g., a called party). Although query 106 is described as an InfoAnalyzed query, query 106 may also be an intelligent network (IN) query, an advanced intelligent network (AIN) query, an intelligent network application part (INAP) initial detection point (IDP) query, a customized applications for mobile networks enhanced logic (CAMEL) query, or any other query implementing query/response-based networking protocols. Notably, those skilled in the art realize that the present subject matter is not limited to AIN/IN-only implementations.

In one embodiment, LNP system 110 may be implemented on a service control point (SCP) separate from routing element 108. In one alternate embodiment, LNP system 110 may be internal to routing element 108. Network routing element 108 may route query 106, which may include the called party number, to LNP system 110.

In response to receiving query 106, LNP system 110 may retrieve a location routing number (LRN) from LNP database 118 based on the called party number. LNP system 110 may return an LNP AnalyzeRoute response message 112 that includes the LRN and the called party number. In one embodiment, the LRN may indicate the serving switching office for the called party number. Those skilled in the art realize that in an Advanced Intelligent Network (AIN) implementation, the InfoAnalyzed query and AnalyzeRoute response pair is used to request/receive an LRN from a service control point (SCP). However, in an Intelligent Network (IN) implementation, the query/response pair may comprise an InstructionStart query and a ControlConnect response message, respectively.

Network routing element 108 may receive response message 112. In one embodiment, an IMS offload function 114 of network routing element 108 is adapted to receive response message 112. Based on the called party number in response message 112, IMS offload function 114 may determine an IMS gateway LRN associated with the called party number. For example, IMS offload function 114 may search an IMS offload function database 116 for an IMS gateway LRN associated with the called party number. Notably if the subscriber identifier (e.g., the called party number) is found in IMS offload function database 116, then function 114 may insert the IMS gateway LRN into response message 112, which may then be routed to end office 102 as response message 113. In one embodiment, the IMS gateway LRN may be inserted in message 112 as received from LNP system 110. If response message 112 includes an LRN value provided by LNP system 110, the IMS gateway LRN may replace the LRN value provided by LNP system 110. If the subscriber identifier is not found in database 116, network routing element 108 routes response message 112 to end office 102 as received from LNP system 110.

Figure 2:
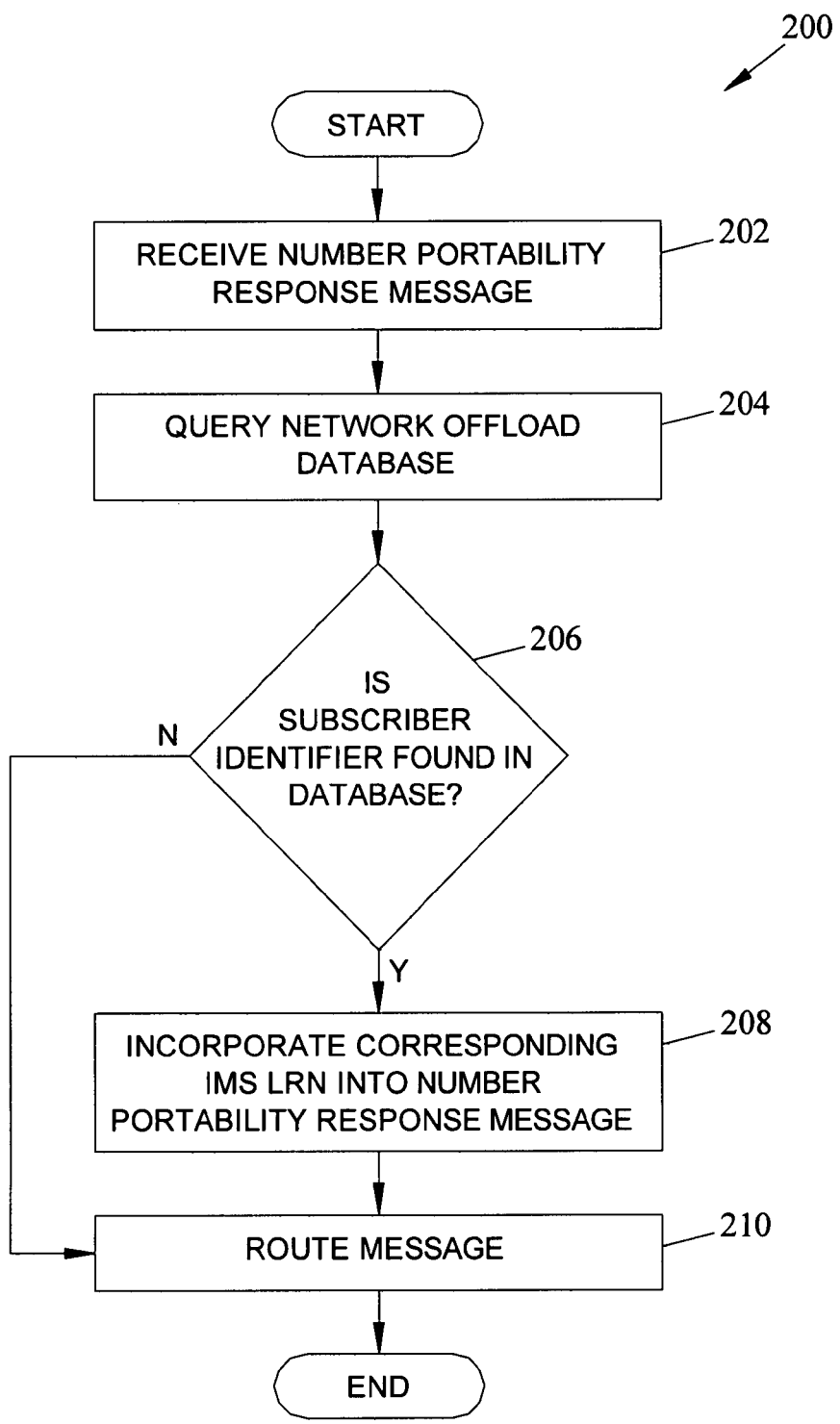
FIG. 2 is a flow chart of an exemplary process for using switching office LRN based query and response capabilities to route a call to an IMS subscriber according to an embodiment of the subject matter described herein.

FIG. 2 illustrates a flow chart of an exemplary method 200 for using switching office LRN based query and response capabilities to route a call to an IMS subscriber in communications network 100 shown in FIG. 1 according to an embodiment of the subject matter described herein. In FIG. 2, like FIG. 1, the LRN based query and response capabilities illustrated are number portability processing capabilities. Referring to FIG. 2, in block 202, IMS offload function 114 may receive a number portability response message including a communications service subscriber identifier. In one embodiment, IMS offload function 114 may receive an AnalyzeRoute response message 112 that includes a called party number and an LRN of a serving switching office.

In block 204, IMS offload function 114 queries a network offload data structure (e.g., a database). In one embodiment, IMS offload function 114 queries a database in order to ascertain if an IMS gateway LRN is associated with the communications service subscriber identifier. For example, IMS offload function 114 may use the called party number from response message 112 to perform a lookup in IMS offload function database 116 for an IMS gateway LRN associated with the called party number.

In block 206, a determination as to whether the subscriber identifier matches an entry in IMS offload function database 116 is made. If a match for the subscriber identifier is not found, the method 200 proceeds to block 210 where the response message is routed normally. If a match is located in database 116, then the method 200 continues to block 208.

In block 208, an IMS gateway LRN associated with the matching entry of the communications service subscriber identifier is incorporated into response message 112. In one embodiment, IMS offload function 114 may insert the IMS gateway LRN associated with the called party number into response message 112. In the event that response message 112 originally contained an LRN value provided by LNP system 110, the newly acquired IMS gateway LRN overwrites the LRN value.

In block 210, the response message is routed. In one embodiment, network routing element 108 may route and subsequently transmit response message 112 with the inserted IMS gateway LRN to end office 102 (i.e., the LNP query originator). The method 200 then ends.

In an alternate embodiment, STP 108 is adapted to receive an InfoAnalyzed message and to generate a copy of at least a portion of the InfoAnalyzed message, including the called party subscriber information and sufficient transaction identification information to allow the InfoAnalyzed message to be correlated with the corresponding AnalyzeRoute message. The InfoAnalyzed message copy information is temporarily buffered, and the originally received InfoAnalyzed message is routed to LNP system 110 for LNP translation processing. The temporary buffer may, for example, be a RAM or hard drive-based data storage element associated with IMS offload function 114. LNP system 110 processes the InfoAnalyzed query message and generates an AnalyzeRoute response message. The AnalyzeRoute message is received by STP 108, and the previously buffered InfoAnalyzed message copy information is retrieved. The retrieved called party subscriber information is used to access IMS offload database 116. If a matching entry is located in the IMS offload database, then the IMS offload database returns an IMS gateway LRN. The IMS gateway LRN is incorporated into response message 112. In one embodiment, IMS offload function 114 may insert the IMS gateway LRN associated with the called party number into response message 112. In the event that response message 112 originally contained an LRN value provided by LNP system 110, the newly acquired IMS gateway LRN overwrites the LRN value. If a matching entry for the subscriber identifier is not found in the IMS offload database, then response message 112 is simply routed to the query originator, end office (EO) 102.

Figure 3:
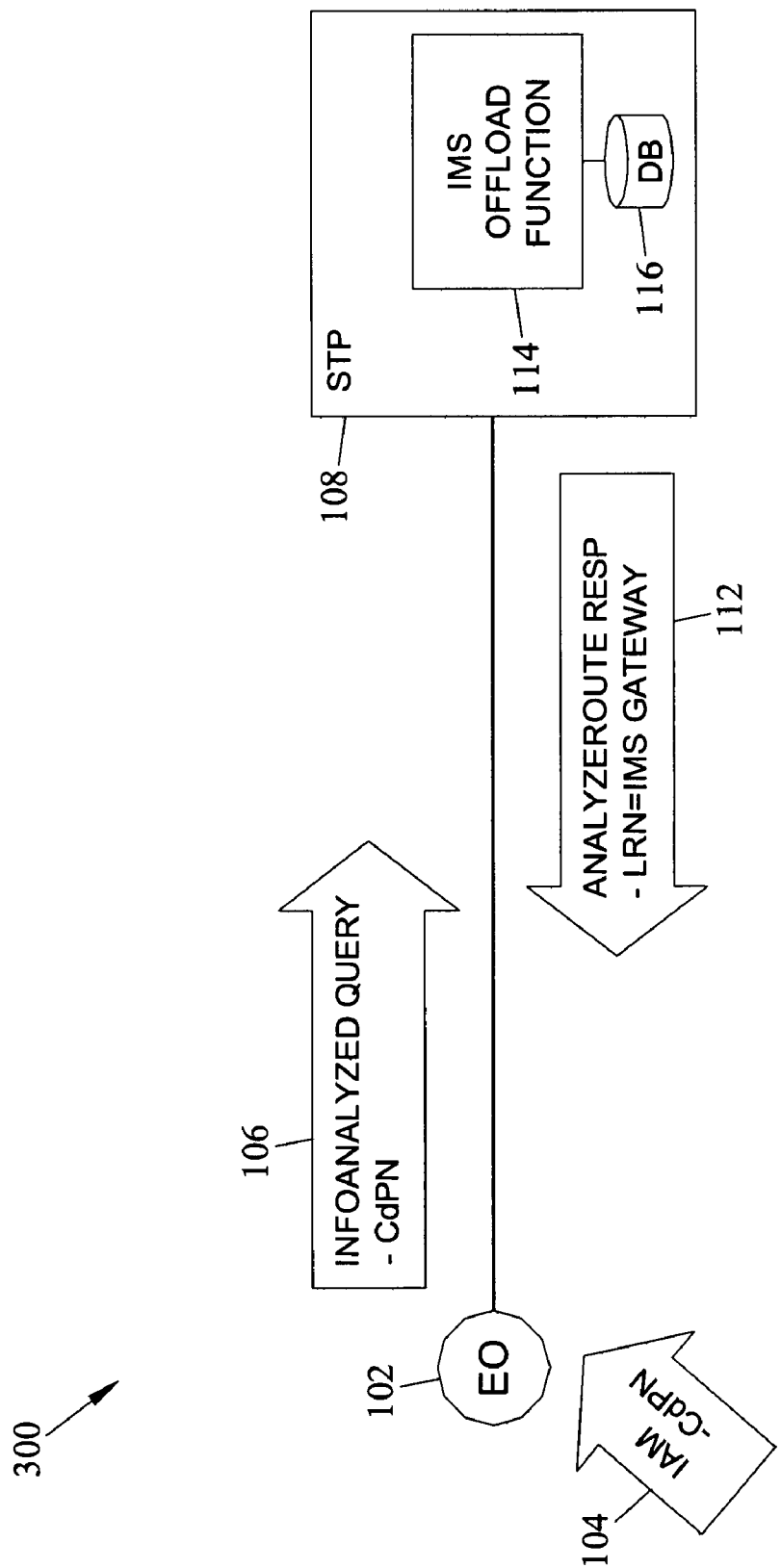
FIG. 3 is a network diagram illustrating an exemplary system in which an IMS offload function generates an LRN based AnalyzeRoute response message and in which a call is routed to a subscriber via an IMS gateway in a communications network according to an embodiment of the subject matter described herein.

In one embodiment, IMS offload function 114 may be adapted to generate the response message instead of modifying a received response message. For instance, IMS offload function 114 may be configured to generate an AnalyzeRoute response message in response to receiving an InfoAnalyzed query from a switching office. FIG. 3 illustrates an exemplary system in which IMS offload function 114 generates an AnalyzeRoute response message in response to receiving an InfoAnalyzed query in a communications network, generally designated 300, according to an embodiment of the subject matter described herein. Referring to FIG. 3, in response to a call attempt 104, end office 102 may send LNP InfoAnalyzed query 106, which includes a called party number or like communications service subscriber identifier, to network routing element 108.

In one embodiment, IMS offload function 114 may receive query 106 and extract the called party number from the query message. Based on the called party number in query 106, IMS offload function 114 may determine an IMS gateway LRN associated with the called party number (i.e., the subscriber identifier). For example, IMS offload function 114 may search IMS offload function database 116 for an IMS gateway LRN associated with the called party number. If the called party number is found, function 114 may generate an AnalyzeRoute response message 112 that includes the IMS gateway LRN. Message 112 may be subsequently routed to end office 102. As a result, function 114 may operate on behalf of an LNP system, and in a manner that generally shields the LNP system from unnecessary query traffic. Alternatively, if an entry matching the called party number is not found in database 116, network routing element 108 may route query 106 to an LNP system (e.g., LNP SCP/subsystem) for LNP processing.

Figure 4:
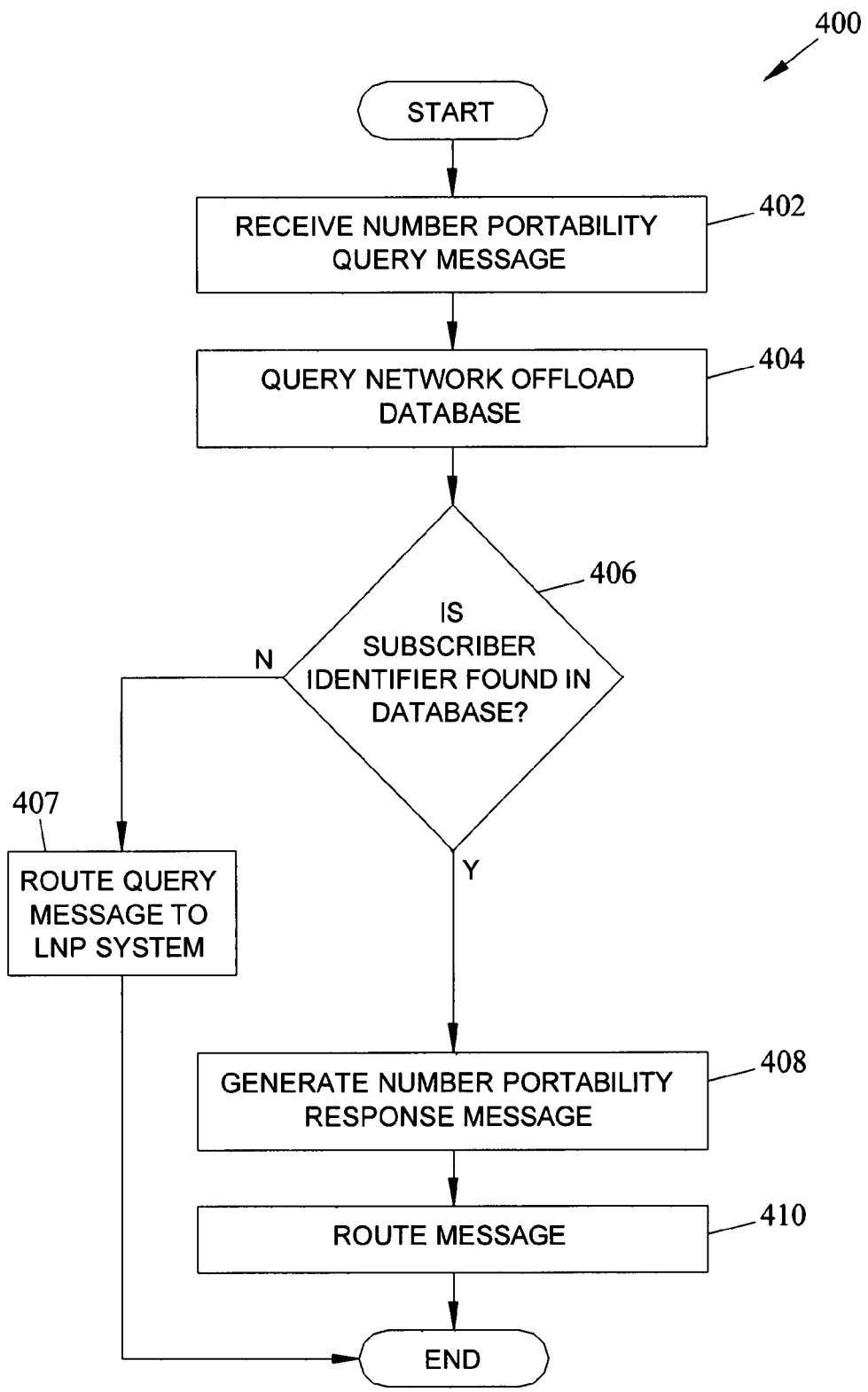
FIG. 4 is a flow chart of an exemplary process in which an IMS offload function generates an LRN based AnalyzeRoute response message in response to a received query message in the communications network shown in FIG. 4 according to an embodiment of the subject matter described herein.

FIG. 4 illustrates a flow chart of an exemplary method 400 in which IMS offload function 114 generates an AnalyzeRoute response message in communications network 300 shown in FIG. 3 according to an embodiment of the subject matter described herein. Referring to FIG. 4, in block 402, IMS offload function 114 may receive a number portability query message including a communications service subscriber identifier. For example, IMS offload function 114 may receive InfoAnalyzed query message 106, which contains a called party number.

In block 404, IMS offload function 114 may query a network offload data structure (e.g., a database). In one embodiment, IMS offload function 114 queries a database 116 in order to determine if an IMS gateway LRN is associated with the communication service subscriber identifier. For example, IMS offload function 114 may perform a lookup in IMS offload database 116 for an IMS gateway LRN associated with the called party number contained in InfoAnalyzed query message 106.

In block 406, a determination as to whether the subscriber identifier matches an entry in IMS offload function database 116 is made. If a match for the subscriber identifier is not found, the method 400 proceeds to block 407 where the query message is routed to an LNP system for LNP processing. If a match is located in database 116, then the method 400 continues to block 408.

In block 408, in response to locating the IMS gateway LRN, IMS offload function 114 may generate a number portability response message associated with the number portability query message and including the IMS gateway LRN. For example, offload function 114 may generate response message 112 after receiving query 106. Response message 112 may include the IMS gateway LRN associated with the called party number contained in query 106.

In block 410, the response message is routed. In one embodiment, network routing element 108 may route and subsequently transmit message 112 to end office 102 (i.e., the LNP query originator). The method 400 then ends.

Any suitable network routing element may include an IMS offload function in accordance with the subject matter described herein. For example, an IMS offload function may be included in an SS7/IP-capable STP network routing element, a signaling gateway (SG) network routing element, a media gateway controller element, or a softswitch element. In one example, a suitable system for routing a call to a subscriber via an IMS gateway in communications network according to the subject matter described herein may include an EAGLE STP® or an IP7 SECURE GATEWAY® (both commercially available from Tekelec of Morrisville, N.C.).

Figure 5:
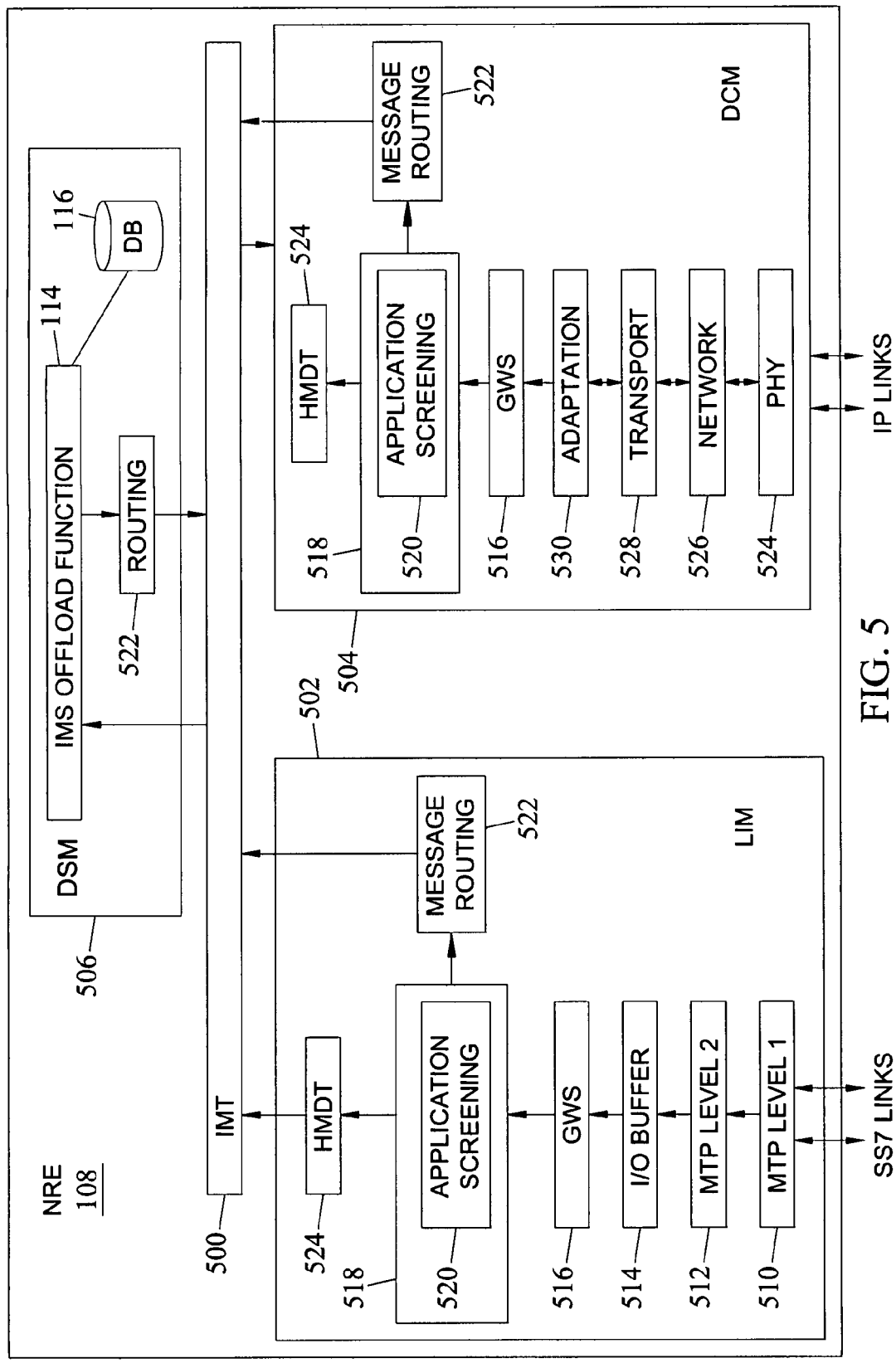
FIG. 5 is a block diagram of a signal transfer point (STP) network routing element including an IMS offload function according to an embodiment of the subject matter described herein.

FIG. 5 illustrates a network routing element 108 (e.g., an STP routing node with SS7/IP gateway functionality) including an IMS offload function 114 according to an embodiment of the subject matter described herein. Referring to FIG. 5, network routing element 108 includes an interprocessor message transport (IMT) bus 500 that is the main communication bus among internal subsystems within network routing element 108. In one embodiment, this high-speed communications system includes two counter-rotating serial rings. A number of processing modules or cards may be coupled to IMT bus 500. In FIG. 5, IMT bus 500 may be coupled to a link interface module (LIM) 502, a data communications module (DCM) 504, and a database service module (DSM) 506, which includes an IMS offload function 114. These modules are physically connected to IMT bus 500 such that signaling and other types of messages may be routed internally between active cards or modules. For simplicity of illustration, a single LIM card, a single DCM card, and a single DSM card are included in FIG. 5. However, network routing element 108 may include multiple other LIMs, DCMs, and DSMs, and other cards, all of which may be simultaneously connected to and communicating via IMT bus 500.

Each module 502, 504, and 506 may include an application processor and a communication processor. The communication processor may control communication with other modules via IMT bus 500. The application processor on each module may execute the applications or functions that reside on each module. For example, the application processor on DSM 506 may execute software that implements IMS offload function 114. Similarly, the application processor on LIM 502 may execute software that implements a screening function for determining whether messages should be forwarded to DSM 506 for application to an IMS offload function.

LIM 502 may include an SS7 MTP level 1 function 510, an SS7 MTP level 2 function 512, an I/O buffer 514, a gateway screening (GWS) function 516, an SS7 MTP level 3 message handling and discrimination (HMDC) function 518, including an application screening function 520, a message routing function 522, and a message handling and distribution (HMDT) function 524. MTP level 1 function 510 sends and receives digital data over a particular physical interface. MTP level 2 function 512 provides error detection, error correction, and sequenced delivery of SS7 message packets. I/O buffer 514 provides temporary buffering of incoming and outgoing signaling messages.

GWS function 516 examines received message packets and determines whether the message packets should be allowed in network routing element 108 for processing and/or routing. HMDC function 518 performs discrimination operations, which may include determining whether the received message packet requires processing by an internal processing subsystem or is simply to be through switched (i.e., routed on to another node in the network). Messages that are permitted to enter network routing element 108 may be routed to other communications modules in the system or distributed to an application engine or processing module via IMT bus 500. Routing function 522 may route received messages that are identified by discrimination function 518 as requiring routing to the appropriate LIM or DCM associated with the message destination. Exemplary routing criteria that may be used by routing function 522 to route messages include destination point code (DPC), origination point code (OPC), circuit identifier code (CIC), service indicator (SI), inbound linkset, or any combination thereof. Message handling and distribution (HMDT) function 524 distributes messages identified by discrimination function 518 as requiring further processing to the appropriate processing module within network routing element 108 for providing the processing.

Application screening function 520 may examine received message packets and determine whether the message packets should be forwarded to DSM 506 for application to IMS offload function 114. For example, application screening function 520 may determine whether a received message packet is a number portability response message including a called party number. In particular, for example, application screening function 520 may determine whether a received message packet is an AnalyzeRoute response message such as response message 112. In another example, application screening function 520 may determine whether a received message packet is a number portability query message including a called party number. In particular, for example, application screening function 520 may determine whether a received message packet is an InfoAnalyzed query, such as query 106. If it is determined that the received message should be forwarded to DSM 506, the message is forwarded to DSM 506 for application to IMS offload function 114. If it is determined that the received message should not be forwarded to DSM 506, the message will be routed by network routing element 108 without application to an IMS offload function.

DCM 504 includes functionality for sending and receiving SS7 messages over IP signaling links. In the illustrated example, DCM 504 includes a physical layer function 524, a network layer function 526, a transport layer function 528, an adaptation layer function 530, and functions 516, 518, 520, 522, and 524 described above with regard to LIM 502. Physical layer function 524 performs open systems interconnect (OSI) physical layer operations, such as transmitting messages over an underlying electrical or optical interface. In one example, physical layer function 524 may be implemented using Ethernet. Network layer function 526 performs operations, such as routing messages to other network nodes. In one implementation, network layer function 526 may implement Internet protocol. The transport layer function 528 implements OSI transport layer operations, such as providing connection oriented transport between network nodes, providing connectionless transport between network nodes, or providing stream oriented transport between network nodes. Transport layer function 528 may be implemented using any suitable transport layer protocol, such as stream control transmission protocol (SCTP), transmission control protocol (TCP), or user datagram protocol (UDP). Adaptation layer function 530 performs operations for sending and receiving SS7 messages over IP transport. Adaptation layer function 530 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 518, 520, 522, and 524 perform the same operations as the corresponding components described above with regard to LIM 502.

DSM 506 receives messages identified for application to IMS offload function 114. In one embodiment, function 114 determines an IMS gateway LRN associated with the called party number in a received AnalyzedRoute response message. In particular, function 114 may use the called party number in the received message to perform a lookup in database 116 for an IMS gateway LRN associated with the called party number. The IMS gateway LRN associated with the communications service subscriber identifier is inserted into the received message. After insertion of the IMS gateway LRN, the message can be forwarded to a routing function 522 for routing to LIM 502 or DCM 504 via IMT bus 500. If no IMS gateway LRN is found that is associated with the called party number, then no LRN in inserted in the received message. LIM 502 or DCM 504 may then forward the message to an appropriate switching office.

Table 1 below shows exemplary entries in a database for associating a called party number with an IMS gateway LRN.

TABLE 1

Exemplary Entries for Associating a Called Party Number with an IMS gateway LRN

| Called Party Number | IMS gateway LRN |
|---|---|
| 9194605500 | 9195550000 |
| 9194691010 | 9195550001 |

The entries shown in Table 1 may be stored, for example, in database 116. IMS offload function 114 may use a called party number in a received number portability message to perform a lookup in the table for determining whether an IMS gateway LRN is associated with the called party number. If an entry including an IMS gateway LRN is found for the called party number, it may be determined that the called party number is associated with the IMS gateway LRN. In one example, if the called party number 9194605500 is contained in an AnalyzeRoute response message, IMS offload function 114 may insert the IMS gateway LRN 9195550000 into the message and routing function 522 may forward the message to LIM 502 or DCM 504 for forwarding to an appropriate switching office. In another example, if the called party number 9194691010 is contained in an AnalyzeRoute response message, IMS offload function 114 may insert the IMS gateway LRN 9195550001 into the message and routing function 522 may forward the message to LIM 502 or DCM 504 for forwarding to an appropriate switching office.

In one implementation, database 116 may include a range-based datastructure and an exception based datastructure. Tables 2 and 3 shown below illustrate examples of a range based datastructure and an exception based datastructure that may be used to implement database 116 according to an embodiment of the subject matter described herein.

TABLE 2

Exemplary Entries for Associating Called Party Number Ranges with an IMS gateway LRN

| Called Party Number Begin Range | Called Party Number End Range | IMS gateway LRN |
|---|---|---|
| 9194605000 | 9194605999 | 9195550010 |
| 9194691000 | 9194691999 | 9195550011 |

TABLE 3

Exemplary Exception Entries for Associating a Called Party Number with an IMS gateway LRN

| Called Party Number | IMS gateway LRN |
|---|---|
| 9194605500 | 9195550000 |
| 9194691010 | 9195550001 |

The entries shown in Tables 2 and 3 may be stored, for example, in database 116. IMS offload function 114 may use a called party number in a received number portability message to first perform a lookup in Table 3 (the exception-based data structure) for determining whether an IMS gateway LRN is associated with the called party number. If the lookup in the exception-based data structure fails to locate a matching entry, a lookup may then be performed in Table 2 (range-based data structure). If an entry for the called party number including an IMS gateway LRN is found in either lookup, it may be determined that the called party number is associated with the IMS gateway LRN. In one example; if the called party number 9194605123 is contained in an AnalyzeRoute response message, the exceptions-based lookup will not result in a match, the range-based lookup will result in a match, and IMS offload function 114 will insert the IMS gateway LRN 9195550010 into the message. Routing function 522 will then forward the message to LIM 502 or DCM 504 for forwarding to an appropriate switching office. In another example, if the called party number 9194691123 is contained in an AnalyzeRoute response message, the exceptions-based lookup will not result in a match, the range-based lookup will result in a match, and IMS offload function 114 will insert the IMS gateway LRN 9195550011 into the message. Routing function 522 will then forward the message to LIM 502 or DCM 504 for forwarding to an appropriate switching office.

As described above, Table 3 includes exceptions to the ranges of numbers provided in the entries of Table 2. In one example, an exception may be a number that is within the range but instead has a different LRN or routing rule. For example, the first entry in Table 3 corresponds to called party number 9194605500. This number is within the range of 9194605000-9194605999 that corresponds to the first entry in Table 2. However, the entries have different LRNs. Thus, an exception based table, such as that illustrated in FIG. 3 may be used to flexibly allocate different routing instructions for numbers that are assigned to IMS subscribers. If a received called party number matches the called party number in an entry of Table 3, the IMS gateway LRN in the entry of Table 3 is used for insertion into the received message. For example, if the received called party number is 9194605500, the exception-based lookup results in a match, the range-based lookup is bypassed, and the IMS gateway LRN 9195550000 is used for insertion into the received message. In another example, if the received called party number is 9194691010, the exception-based lookup results in a match, the range-based lookup is bypassed, and the IMS gateway LRN 9195550001 is used for insertion into the received message.

In one embodiment, instead of maintaining the subscriber identifier number and IMS gateway RN mapping information in IMS offload function 114 or database 116, the IMS offload function 114 stores a default IMS gateway routing number, which is returned in an number portability response message if it is determined that the called subscriber is an IMS subscriber. Depending on the embodiment, STP 108 may contain a single default gateway number or a plurality of default gateway numbers (e.g., each of which may be mapped to a certain area code). The determination as to whether a called subscriber is an IMS subscriber may be made by having the IMS offload function query an external IMS subscriber profile database, such as a home subscriber service (HSS) server, ENUM server, or the like. If it is determined that the called subscriber is not an IMS subscriber or is not available in the IMS network, then the NP query is simply routed to a number portability system.

In the examples described above, IMS offload function 114 performs a lookup based on a called party number in a received info analyzed response message. In one implementation of the subject matter described herein, the lookup may only be performed if the LRN associated with the called party number corresponds to an in-network node or switching office. For example, IMS offload function 114 may receive an AnalyzeRoute response message including an LRN and a called party number. IMS offload function 114 may determine whether the received LRN is associated with an in-network node. In order to make this determination, IMS offload function 114 may use the received LRN to search perform a lookup in database 116 for an indication that the received LRN is associated with an in-network node. In response to determining that the received LRN is associated with an in-network node, IMS offload function 114 may determine an IMS gateway LRN associated with the called party number. For example, IMS offload function 114 may use the received called party number to perform a lookup in database 116 for an IMS gateway LRN associated with the received called party number. Further, in response to determining that the received LRN is associated with an in-network node, IMS offload function 114 inserts the IMS gateway LRN associated with the called party number into the received message. After insertion of the IMS gateway LRN, the message can be forwarded to a routing function 522 for routing to LIM 502 or DCM 504 via IMT bus 500. LIM 502 or DCM 504 forwards the message to an appropriate switching office. If the received LRN is not associated with an in-network node or no IMS gateway LRN is found that is associated with the called party number, then no additional LRN is inserted in the received message and the message is forwarded for routing to LIM 502 or DCM 504, for forwarding to an appropriate switching office.

As stated above, IMS offload function 114 may be configured to generate an AnalyzeRoute response message in response to receiving an InfoAnalyzed query. In another embodiment, IMS offload function 114 may receive or intercept (depending on whether the query is addressed to routing node 108) a number portability query message including a called party number. IMS offload function 114 may determine an IMS gateway LRN associated with the communication service provider identifier. For example, IMS offload function 114 may use the called party number to perform a lookup in database 116 for an IMS gateway LRN associated with the called party number. In response to determining the IMS gateway LRN, IMS offload function 114 may generate a number portability response message associated with the number portability query message and including the IMS gateway LRN. The generated response message may include the IMS gateway LRN associated with the called party number. After insertion of the IMS gateway LRN, the generated response message can be forwarded to routing function 522 for routing to LIM 502 or DCM 504 via IMT bus 500. LIM 502 or DCM 504 forwards the response message to an appropriate switching office. If an IMS gateway LRN associated with the called party number is not found in database 116, routing function 522 of DSM 506 may forward the query to LIM 502 or DCM 504 for forwarding to an appropriate LNP system for LNP processing.

An LRN as described herein may include any identifier that is used to identify a switching point in a circuit switched or a packet switched communication network. An LRN identifier may include, but is not limited to, an E.164 formatted network entity address identifier, an SS7 point code address, an Internet protocol (IP) address, or a uniform resource identifier (URI).

Figure 6:
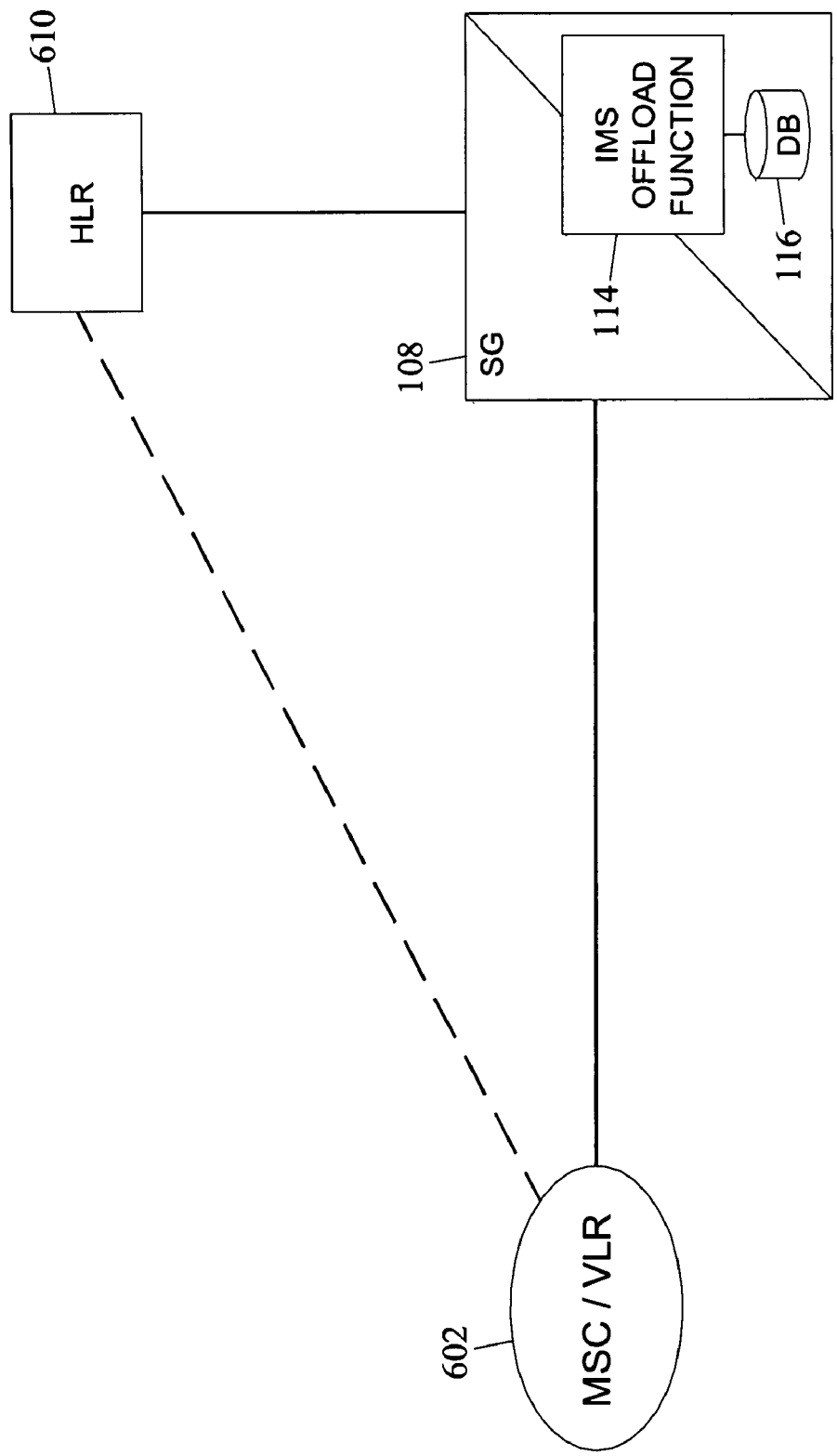
FIG. 6 is a network diagram illustrating an exemplary system in which switching office LRN based query and response capabilities are used to route a wireless call to an IMS subscriber according to an embodiment of the subject matter described herein

The present subject matter may also be applied to a strictly wireless scenario. For example, FIG. 6 depicts an exemplary system for using switching office LRN query and response functionality to route a wireless call to an IMS subscriber. Referring to FIG. 6, mobile switching center (MSC) 602 (or a visitor location register (VLR)) generates a mobile application part (MAP) Send_Routing_Information (SRI) query that requests call routing information (e.g., a routing number (RN)) for the called party number in response to a calling mobile subscriber dialing the called party number. Specifically, MSC 602 transmits the SRI query (instead of an InfoAnalyzed query) towards a home location register (HLR) 610 that is servicing the called party number. SG 108 intercepts the SRI query, examines the called party subscriber identifier contained in the SRI query, and subsequently uses the identifier to perform a lookup in IMS offload database 116. If a matching entry is located in database 116, an IMS gateway RN associated with the matching entry is returned. IMS offload function generates an SRI Acknowledgement message, which includes the IMS gateway RN, and transmits it to MSC 602. If no matching entry is found in the IMS offload database 116, then the SRI query is simply routed to the HLR 610 normally.

In another wireless embodiment, the IMS offload function 114 (or database 116) does not include subscriber-to-IMS gateway RN mapping information. Instead, IMS offload function 114 includes only a default IMS gateway RN, which is returned in an SRI Acknowledgement response message if it is determined that the called subscriber is an IMS subscriber. In another embodiment, IMS offload function 114 includes a plurality of default IMS gateway RNs (e.g., each of which corresponds to a certain prefix or area code associated to the called party).

In an embodiment related to the wireless embodiment described in the preceding paragraph, IMS offload function 114 may contain a plurality of default IMS Gateway RNs (as specified above). In one scenario, HLR 610 transmits a subscriber profile and/or service key to MSC 602. For example, in the event a mobile subscriber either connects to the network or roams to the MSC (or VLR) 602, MSC 602 sends the mobile subscriber's registration information to HLR 610. In response, HLR 610 transmits the appropriate subscriber profile data and service key information (i.e., "service key data") back to MSC 602. MSC 602 stores the service key data and includes at least a portion of the service key data into an SRI query message, which is received by SG 108. IMS offload function 114 uses the service key data to determine whether the call should be directed to an IMS network. If the service key data indicates that the called subscriber is an IMS subscriber, then IMS offload function 114 generates an SRI Acknowledgment response message that includes a default IMS gateway RN. Consequently, the present subject matter effectively shields HLR 610 from unnecessary traffic. Conversely, if it is determined that the called subscriber is not an IMS subscriber (or is not available in the IMS network), then the SRI query is simply routed to HLR 610.

In another related wireless embodiment where IMS offload function 114 does not include subscriber identifier to IMS gateway LRN mapping information, SG 108 queries HLR 610 to obtain the service key data after receiving an SRI message containing the called party's subscriber identifier from MSC 602. In one example, the IMS offload function 114 queries HLR 610 for subscriber profile data or a service key, i.e., "service key data," that is associated with the called party's subscriber identifier in order to determine whether the called subscriber is an IMS subscriber. In the event the HLR response containing the service key data indicates the called subscriber is an IMS subscriber, then IMS offload function 114 generates an SRI Acknowledgement response message, which includes a default IMS gateway RN. In one embodiment, IMS offload function 114 may include a single default IMS gateway RN or a plurality of default IMS gateway RNs that are based on the called party's prefix (e.g., area code). If it is determined that the called subscriber is not an IMS subscriber then the SRI query is simply routed to HLR 610.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for routing a call, the method comprising:
at a network routing element separate from a number portability database and a switching office that originates a number portability query:
   (a) intercepting a number portability response message that includes a first location routing number (LRN) and a communications service subscriber identifier, the number portability response being generated by the number portability database in response to the number portability query and being destined for the switching office;
   (b) in response to intercepting the number portability response message, querying a network offload data structure located within the network routing element using the communications service subscriber identifier to obtain an Internet protocol multimedia subsystem (IMS) gateway LRN associated with the communications service subscriber identifier;
   (c) inserting the Internet Protocol multimedia subsystem (IMS) gateway LRN associated with the communications service subscriber identifier into the number portability response message if an entry in the network offload data structure matches the communications service subscriber identifier, wherein inserting the IMS gateway LRN includes replacing the first LRN in the number portability response message with the IMS gateway LRN; and
   (d) routing the number portability response message to the switching office.

2. The method of claim 1, wherein querying includes searching a database for an entry including the communications service subscriber identifier, wherein the entry includes the IMS gateway LRN.

3. The method of claim 1, wherein querying includes:
   (a) determining whether an entry including the communications service subscriber identifier is located in a first database comprising entries including a plurality of communications service subscriber identifiers and a plurality of associated IMS gateway LRNs, wherein the first database includes the communications service subscriber identifier exceptions to ranges of communications service subscriber identifiers in a second database; and
   (b) in response to determining that an entry including the communications service subscriber identifier is not located in the first database, searching the second database for an entry including a range of communications service subscriber identifiers with the communications service subscriber identifier, wherein the entry of the second database including the range of communications service subscriber identifiers with the communications service subscriber identifier includes the IMS gateway LRN.

4. A method for routing a call, the method comprising:
   (a) receiving, at a network element and from a switching office, a location routing number (LRN) based query message destined for a local number portability database separate from the network routing element and including a communications service subscriber identifier;
   (b) querying, at the network routing element, a network offload data structure located within the network routing element using the communications service subscriber identifier;
   (c) acquiring, at the network routing element and from the network offload data structure, an Internet Protocol multimedia subsystem (IMS) gateway LRN associated with the communications service subscriber identifier if an entry in the network offload data structure matches the communications service subscriber identifier;
   (d) generating, at the network routing element, an LRN based response message associated with the LRN based query message, wherein the LRN based response message includes the IMS gateway LRN; and
   (e) routing the LRN based response message from the network routing element to the switching office and thereby shielding the local number portability database from unnecessary query message traffic.

5. The method of claim 4, wherein the LRN based query message comprises a number portability query message and the LRN based response message comprises a number portability response message.

6. The method of claim 5, wherein querying includes:
   (a) determining whether an entry including the communications service subscriber identifier is located in a first database comprising entries including a plurality of communications service subscriber identifiers and a plurality of associated IMS gateway LRNs, wherein the first database includes the communications service subscriber identifier exceptions to ranges of communications service subscriber identifiers in a second database; and
   (b) in response to determining that an entry including the communications service subscriber identifier is not located in the first database, searching the second database for an entry including a range of communications service subscriber identifiers with the communications service subscriber identifier, wherein the entry of the second database including the range of communications service subscriber identifiers with the communications service subscriber identifier includes the IMS gateway LRN.

7. The method of claim 5, wherein routing the number portability response message includes routing the number portability response message to an originator of the number portability query message associated with the number portability response message.

8. The method of claim 5, wherein receiving the number portability query message includes intercepting the number portability query message at a network routing node located between a query originating signaling point and a number portability database.

9. The method of claim 5, further comprising routing the number portability query message to a number portability system if the entry in the network offload data structure does not match the communications service subscriber identifier.

10. The method of claim 4, wherein the LRN based query message comprises a send routing information (SRI) query message and the LRN based response message comprises an SRI acknowledgement response message.

11. The method of claim 4, wherein querying includes searching a database for an entry including the communications service subscriber identifier, wherein the entry includes the IMS gateway LRN.

12. A system for routing a call to a subscriber via an Internet Protocol multimedia subsystem (IMS) gateway, the system comprising:
   at a network routing element separate from a number portability database and a switching office that originates a number portability query:
   (a) a communications module configured to intercept a number portability response message including a communications service subscriber identifier, the number portability response being generated by the number portability database in response to the number portability query and being destined for the switching office; and (b) an IMS offload function configured to, in response to intercepting the number portability response message, determine an IMS gateway location routing number (LRN) associated with the communications service subscriber identifier, configured to the IMS gateway LRN associated with the communications service subscriber identifier into the number portability response message, and configured to route the number portability response message to the switching office, and wherein the IMS offload function is configured to replace an LRN in the number portability response message with the IMS gateway LRN.

13. The system of claim 12, wherein the IMS offload function is configured to search a database for an entry including the communications service subscriber identifier and wherein the entry includes the IMS gateway LRN.

14. The system of claim 12, wherein the IMS offload function is configured to:

(i) determine whether an entry including the communications service subscriber identifier is located in a first database comprising entries including a plurality of communications service subscriber identifiers and a plurality of associated IMS gateway LRNs, wherein the first database includes communications service subscriber identifier exceptions to ranges of communications service subscriber identifiers in a second database; and (ii) search the second database, in response to determining that an entry including the communications service subscriber identifier is not located in the first database, for an entry including a range of communications service subscriber identifiers with the communications service subscriber identifier, wherein entry of the second database including the range of communications service subscriber identifiers with the communications service subscriber identifier includes the IMS gateway LRN.

15. A system for routing a call to a subscriber via an Internet Protocol multimedia subsystem (IMS) gateway, the system comprising:

a network routing element including:

(a) a communications module configured to receive, from a switching office, a location routing number (LRN) based query message destined for a local number portability database separate from the network routing element and including a communications service subscriber identifier; and (b) an IMS offload function configured to:

(i) determine an IMS gateway LRN associated with the communications service subscriber identifier by accessing an IMS offload data structure within the network routing element;

(ii) generate an LRN based response message associated with the LRN based query message and including the IMS gateway LRN in response to determining the IMS gateway LRN; and (iii) route the LRN based response from the network routing element to the switching office and thereby shielding the local number portability database from unnecessary query message traffic.

16. The system of claim 15, wherein the LRN based query message comprises a number portability query message and the LRN based response message comprises a number portability response message.

17. The system of claim 16, wherein the number portability response message is routed to an originator of the number portability query message associated with the number portability response message.

18. The system of claim 16, wherein the communications module is adapted to intercept the number portability query message at a routing node located between a query originating signaling point and a number portability database.

19. The system of claim 16, wherein the IMS offload function is further adapted to:

(a) buffer the communications service subscriber identifier and requisite transaction identification information that permits a matching of the number portability query message with the associated number portability response message; and (b) utilize the buffered communications service identifier to search the local number portability database after the associated number portability response message is received.

20. The system of claim 15, wherein the LRN based query message comprises a send routing information (SRI) query message and the LRN based response message comprises an SRI acknowledgement response message.

21. The system of claim 15, wherein the IMS offload function is configured to search a database for an entry including the communications service subscriber identifier and wherein the entry includes the IMS gateway LRN.

22. The system of claim 15, wherein the IMS offload function is configured for:

(a) determining whether an entry including the communications service subscriber identifier is located in a first database comprising entries including a plurality of communications service subscriber identifiers and a plurality of associated IMS gateway LRNs, wherein the first database includes communications service subscriber identifier exceptions to ranges of communications service subscriber identifiers in a second database; and (b) in response to determining that an entry including the communications service subscriber identifier is not located in the first database, searching the second database for an entry including a range of communications service subscriber identifiers with the communications service subscriber identifier, wherein the entry of the second database including the range of communications service subscriber identifiers with the communications service subscriber identifier includes the IMS gateway LRN.

23. A non-transitory computer readable medium having stored thereon computer executable instructions that when executed by a processor of a computer controls the computer to perform steps comprising:

at a network routing element separate from a number portability database and a switching office that originates a number portability query:

(a) intercepting a number portability response message that includes a first location routing number (LRN) associated with a first network node and a communications service subscriber identifier, the number portability response message being generated by the number portability database in response to the number portability query and being destined for the switching office;

(b) in response to intercepting the number portability response message, querying a network offload data structure within the network routing element using the communications service subscriber identifier to obtain an Internet protocol multimedia subsystem (IMS) gateway LRN associated with the communications service subscriber identifier;

(c) inserting the IMS gateway LRN associated with the communications service subscriber identifier into the number portability response message if an entry in the network offload data structure matches the communications service subscriber identifier, wherein inserting the IMS gateway LRN includes replacing the first LRN in the number portability response message with the IMS gateway LRN; and (d) routing the number portability response message to the switching office.

24. A non-transitory computer readable medium having stored thereon computer executable instructions that when executed by a processor of a computer controls the computer to perform steps comprising:

at a network routing element:
(a) receiving, at the network routing element and from a switching office, a location routing number (LRN) based query message destined for a local number portability database separate from the network routing element and including a communications service subscriber identifier;
(b) querying, at the network routing element, a network offload data structure within the network routing element using the communications service subscriber identifier;
(c) acquiring, at the network element and from the network offload data structure, an Internet Protocol multimedia subsystem (IMS) gateway LRN associated with the communications service subscriber identifier if an entry in the network offload data structure matches the communications service subscriber identifier;
(d) generating, at the network routing element, an LRN based response message associated with the LRN based query message, wherein the LRN based response message includes the IMS gateway LRN; and
(e) routing the LRN based response message from the network routing element to the switching office and thereby shielding the local number portability database from unnecessary query message traffic.

25. The non-transitory computer readable medium of claim 24, wherein the LRN based query message comprises a number portability query message and the LRN based response message comprises a number portability response message.

26. The non-transitory computer readable medium of claim 24, wherein the LRN based query message comprises a send routing information (SRI) query message and the LRN based response message comprises an SRI acknowledgement response message.

* * * * *